United States Patent [19]
Haussels

[11] Patent Number: 5,274,879
[45] Date of Patent: Jan. 4, 1994

[54] TWO-WHEEL CASTER WITH SHIELD RING

[76] Inventor: Berthold Haussels, Am Krupin 15, 5632 Wermelskirchen-Tente, Fed. Rep. of Germany

[21] Appl. No.: 979,525

[22] Filed: Nov. 23, 1992

[51] Int. Cl.$^5$ .................... A47B 91/00; B60B 33/00
[52] U.S. Cl. ........................ 16/48; 16/18 CG
[58] Field of Search .16/47, 48, 35R; 18CG, 31R, 31A

[56] References Cited

U.S. PATENT DOCUMENTS

| | | | |
|---|---|---|---|
| 318,963 | 6/1885 | Curry | 16/47 |
| 4,077,088 | 3/1978 | Melara | 16/18 CG |
| 4,290,166 | 9/1981 | Melara | 16/18 CG |

FOREIGN PATENT DOCUMENTS

| | | | |
|---|---|---|---|
| 2334324 | 1/1975 | Fed. Rep. of Germany | |
| 8424068 | 7/1986 | Fed. Rep. of Germany | |
| 221907 | 9/1924 | United Kingdom | 16/48 |
| 2096254 | 10/1982 | United Kingdom | 16/47 |

Primary Examiner—John Sipos
Assistant Examiner—Carmine Cuda
Attorney, Agent, or Firm—Herbert Dubno; Andrew Wilford

[57] ABSTRACT

A two-wheel furniture caster has a body, a shaft projecting horizontally through the body along a shaft axis and having opposite ends projecting axially oppositely from the body, respective wheels rotatable on the ends of the shaft and having outer tread parts axially delimiting a space wholly containing the body and an upright pivot pin having a lower end projecting into the body offset from the shaft axis along a pivot axis. Bearings generally level with and closely juxtaposed with the shaft axis in the body supporting the pivot pin in the body for rotation therein about the pivot axis. A shield ring generally centered on the shaft axis wholly surrounds the body radially relative to the shaft axis, has axially opposite end edges closely juxtaposed with the respective wheels, and is formed with a hole traversed by the pivot pin.

14 Claims, 4 Drawing Sheets

TWO-WHEEL CASTER WITH SHIELD RING

FIELD OF THE INVENTION

The present invention relates to a caster. More particularly this invention concerns a heavy duty two-wheel caster of the type used on hospital beds.

BACKGROUND OF THE INVENTION

A standard two-wheel caster of the type used on heavy furniture, beds, garbage receptacles, and the like has a body, a shaft projecting horizontally through the body along a shaft axis and having opposite ends projecting axially oppositely from the body, respective wheels rotatable on the ends of the shaft and having outer tread parts axially delimiting a space partially containing the body, and an upright pivot pin having a lower end projecting into the body offset from the shaft axis along a pivot axis. The body can pivot about the pin to align the shaft axis perpendicular to the direction the caster is to roll in. Such systems are described in German utility model G 84 24 068 and German patent document 2,334,324 of H-C. Maier.

Typically the body extends forward out of the between-wheel space and is there provided with bearings in which the pivot pin is seated. Thus there is quite some spacing between the pivot axis and the shaft axis, making the caster body a fairly long lever that subjects these bearings to quite some stress. The long body also means that the item supported must be swung through a relatively wide arc to change direction of travel, and gives the caster an ungainly appearance. Furthermore the wide gap thus left between the wheels can trap dirt and things hanging in the way of the caster, and also presents an unattractive appearance.

OBJECTS OF THE INVENTION

It is therefore an object of the present invention to provide an improved two-wheel caster.

Another object is the provision of such an improved two-wheel caster which overcomes the above-given disadvantages, that is which can change directions easily, that is of very neat appearance, and that is not likely to catch and hold things between the wheels.

SUMMARY OF THE INVENTION

A two-wheel furniture caster has according to the invention a body, a shaft projecting horizontally through the body along a shaft axis and having opposite ends projecting axially oppositely from the body, respective wheels rotatable on the ends of the shaft and having outer tread parts axially delimiting a space wholly containing the body and an upright pivot pin having a lower end projecting into the body offset from the shaft axis along a pivot axis. Bearings generally level with and closely juxtaposed with the shaft axis in the body supporting the pivot pin in the body for rotation therein about the pivot axis. A shield ring generally centered on the shaft axis wholly surrounds the body radially relative to the shaft axis, has axially opposite end edges closely juxtaposed with the respective wheels, and is formed with a bole traversed by the pivot pin.

Thus this arrangement is very compact. Locating two bearings in the between-wheel space, normally vertically symmetrically flanking a horizontal plane including the shaft axis, minimizes the length of the lever arm formed by the body, thereby greatly reducing stress on the bearings. Closing the space radially of the shaft axis with the shield ring and thereby enclosing the body and bearings gives the caster a very neat appearance and prevents something hanging down from getting caught between the wheels.

The caster body is formed with a horizontal rear bore accommodating the shaft and with a vertical front bore accommodating the bearings and the pin lower end. The bearings are roller bearings.

The shield ring can be of one piece or of two similar parts joined generally in a plane including the pin axis and perpendicular to the shaft axis. The shield ring is cylindrically tubular and the tread parts are formed with axially open grooves receiving the end edges of the shield ring. Alternately the shield ring has respective webs extending radially inward from the respective end edges and having inner peripheries riding on hubs of the respective wheels. It can also be formed with axially inwardly directed tabs closely fitting to and surrounding the body so that the tabs support the shield ring on the body.

In accordance with another feature of this invention a brake is provided in the space between the wheels for arresting rotation of the wheels and/or for arresting pivoting of the body on the pin, and an actuator including a rod extending coaxially through the pivot pin and axially displaceable therein for operating the brake. This brake can include a brake shoe engageable outwardly with the tread parts of the wheels and a linkage interconnecting the brake shoe and the actuator rod for pressing the brake shoe outwardly against the wheels on axial movement of the rod in a direction axially of the pin axis from a center position. It can also include a radially projecting pin fixed in the rod adjacent the body and vertically open seat grooves formed in the body adajent the rod and positioned to receive the pin when the rod is shifted axially from the center position in the opposite direction. The rod itself is braced against rotation about its axis.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
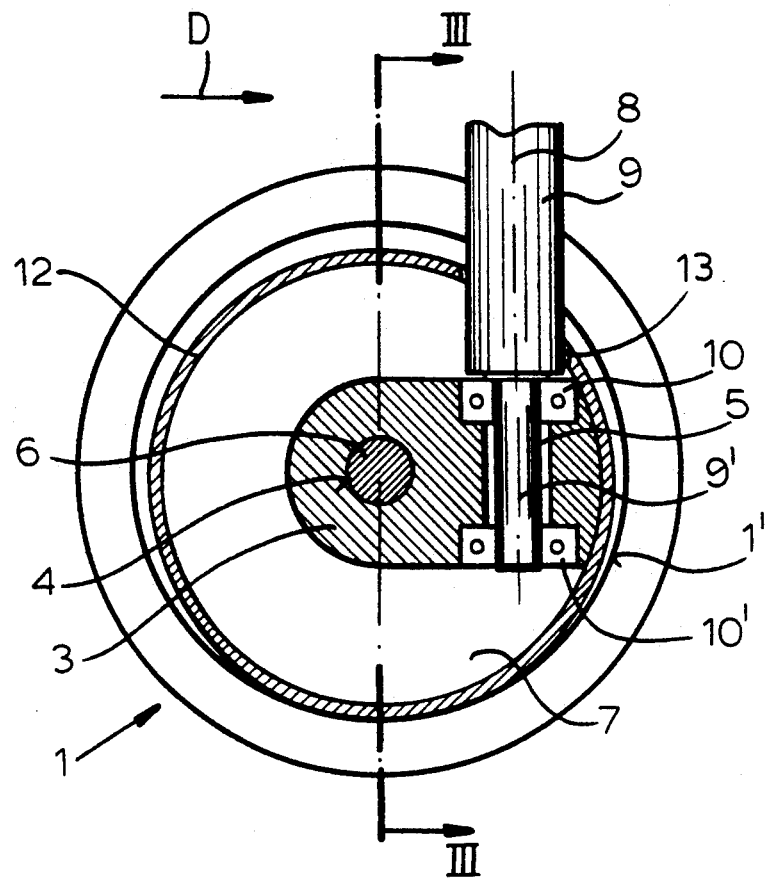
FIG. 1 is a vertical section through a caster according to the invention.
Figure 2:
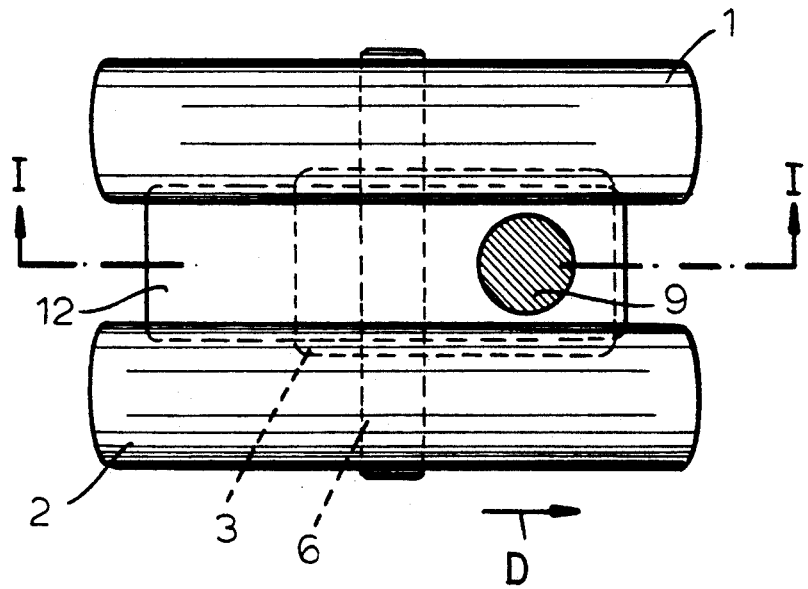
FIG. 2 is a top view of the FIG. 1 caster, line I—I of FIG. 2 representing the section plane of FIG. 1.
Figure 3:
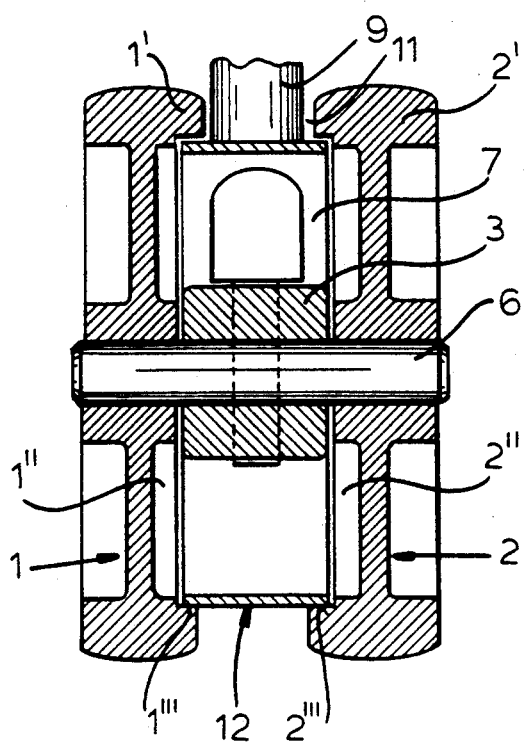
FIG. 3 is a vertical section taken along line III—III of FIG. 1.

As seen in FIGS. 1 through 3 a caster according to this invention has two circular wheels 1 and 2 rotatably carried via unillustrated roller bearings on the respective ends of a horizontal shaft 6 fitted tightly in a horizontal bore 4 traversing a caster body 3. Forward of the shaft 6 relative to the normal travel direction D of the caster is a vertically throughgoing bore 5 in which is seated a pair of vertically spaced roller bearings 10 and 10' in which in turn is journaled a lower end 9' of a vertical pivot pin 9 centered on an vertical axis 8 and whose unillustrated upper end is fixed in the item being carried by the caster. Thus as the pin 9 is drawn along in the direction D perpendicular to its axis 8 the two wheels 1 and 2 will roll on the underlying supporting surface, with the axle 6 naturally aligning itself perpendicular to the direction D behind the pin axis 8. If the pin 9 changes direction, one wheel 1 or 2 can rotate faster than the other or even in the opposite direction.

According to the invention each of the wheels 1 and 2 is of double-T shape and may be made of metal or plastic with an outer tread part 1' or 2' forming an annular cavity 1'' or 2'' that together form a space or compartment 7 in which the body 3 is located. This space 7 is closed axially of the shaft 5 by the wheels 1 and 2 but is radially open in the gap between the wheels 1 and 2. A cylindrical shield ring 12 has as shown in FIG. 3 axially outer edges 12' fitted to radially and axially inwardly open grooves 1''' and 2''' of the tread parts 1' and 2' and is formed with a throughgoing circular hole 13 that fits fairly closely around the pin 9. The ring 12 is of such a diameter that it goes completely around the body 3, encapsulating it completely so that it and the bearings 10 are completely shielded. Thus the shield ring 12 radially closes the space 7 that is axially delimited by the wheels 1 and 2. Since this ring 12 is fairly light, rotation of the two wheels 1 and 2 will cause only minor friction.

Figure 4:
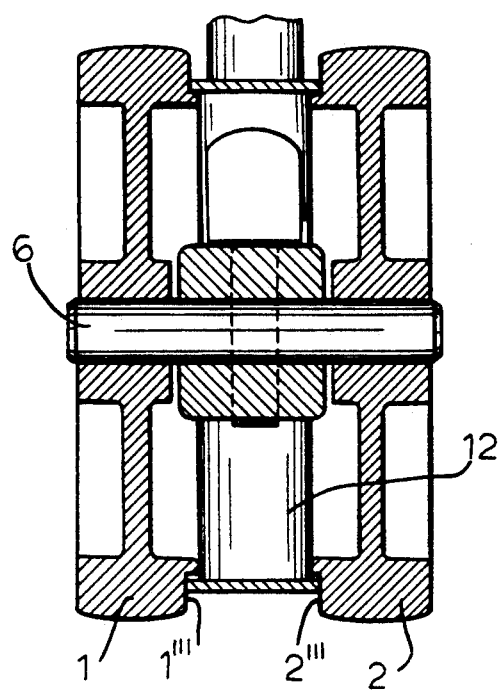
FIGS. 4 through 7 are views like FIG. 3 showing variations on the system of this invention.
Figure 5:
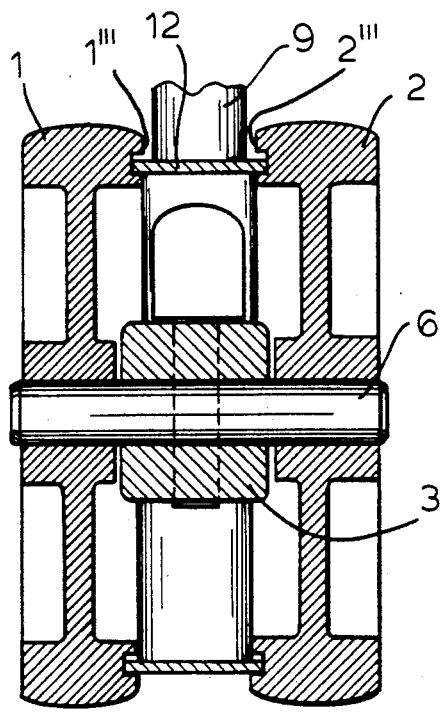

The arrangement of FIG. 4 shows how the grooves 1''' and 2''' are radially outwardly open as well as axially inwardly open, and in FIG. 5 they are only axially inwardly open, forming axially confronting annular grooves. The axial opposite edges 12' of the ring 12 are seated in these grooves 1''' and 2''' as in FIG. 3.

Figure 6:
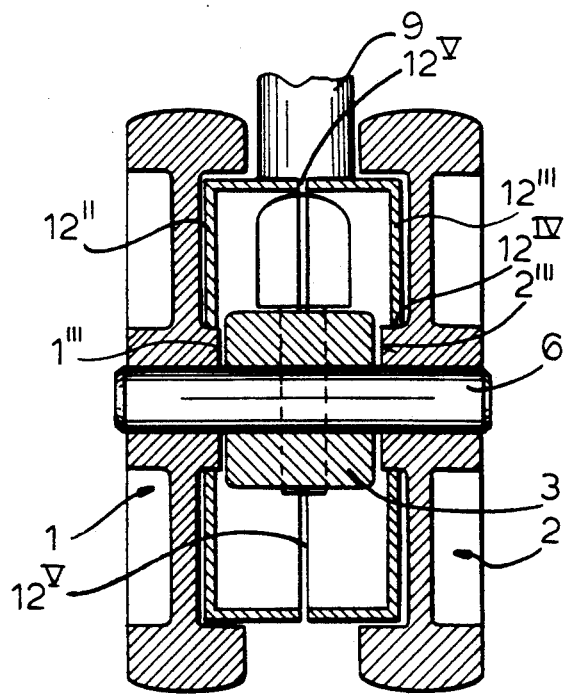

The ring of FIG. 6 is made of two annular L-section parts 12'' and 12''' having radially inner edges 12$^{iv}$ sitting on hub surfaces 1''' and 2''' of the respective wheels 1 and 2 and axially confronting edges 12$^v$ which abut in a vertical plane including the axis 8 and perpendicular to the shaft 6. The edges 12$^v$ may be formed as an axially interfitting tongue and groove or may be provided with a seal.

Figure 7:
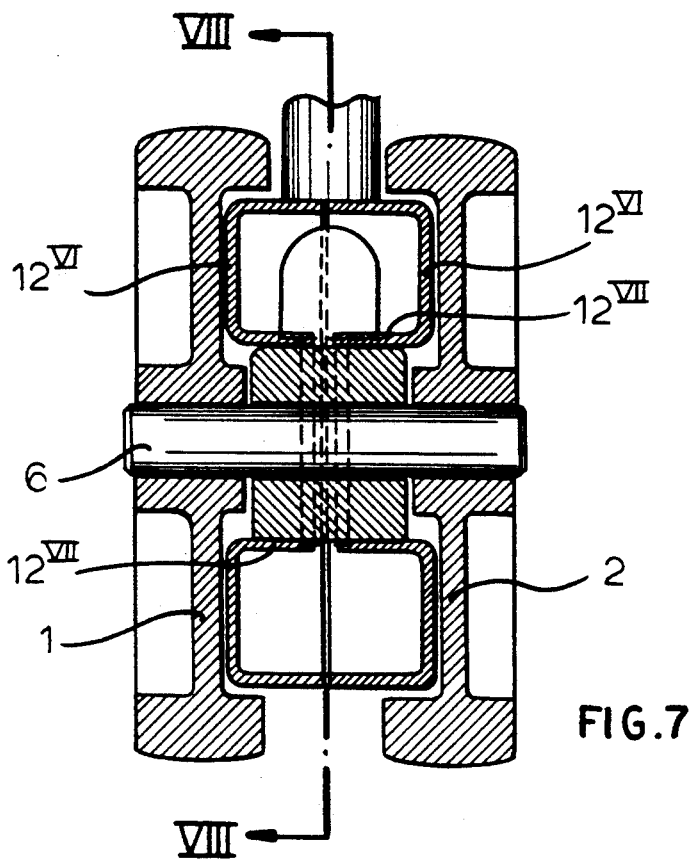
Figure 8:
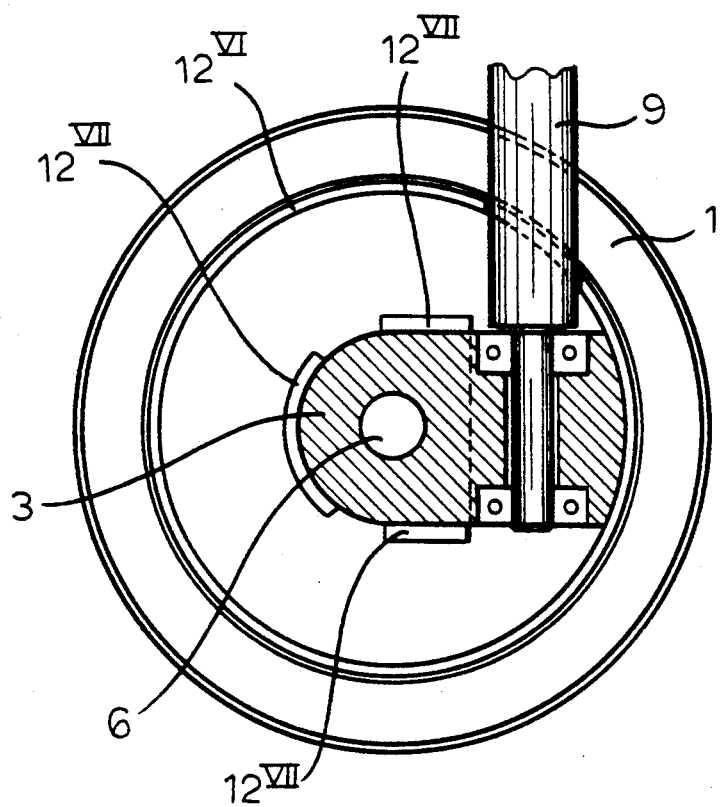
FIG. 8 is a vertical section taken along line VIII—VIII of FIG. 7.

In FIGS. 7 and 8 a two-part ring has halves 12$^{vi}$ formed with radially inner axially inwardly projecting tabs 12$^{vii}$ that snugly engage around the caster body 3, holding the ring halves 12$^{vi}$ perfectly on center and together, largely out of contact with the wheels 1 and 2.

Figure 9:
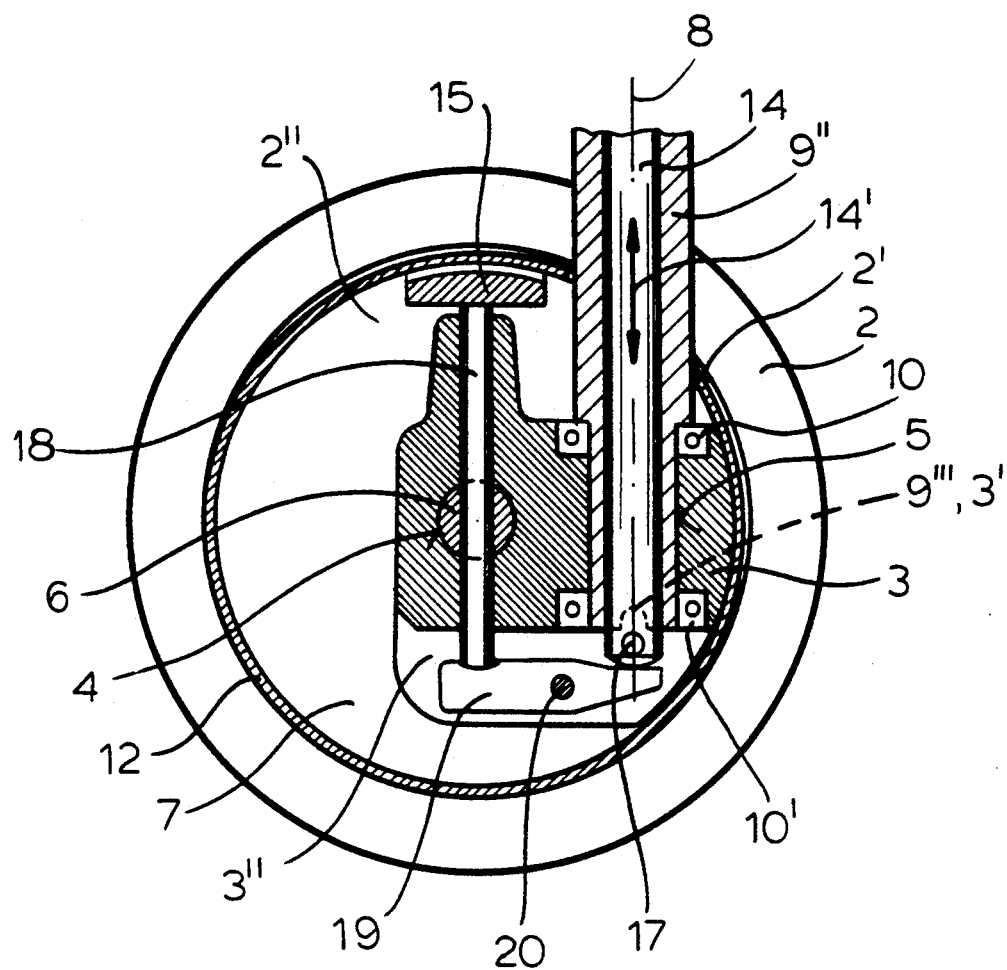
FIG. 9 is a view like FIG. 1 of another caster according to the invention.

The system of FIG. 9 is provided with a pivot lock and a brake. To this end it has a tubular pivot pin 9'' coaxially receiving a rod 14 movable up and down along the axis 8 as indicated by double-headed arrow 14'. Another pin 18 vertically slidable in the body 3 and here passing through the shaft 6, although this is not necessary, has an upper end carrying a brake pad or shoe 15 that can be pressed upward against the disk 12 and thence against the inner surfaces of the tread parts of the wheels 1 and 2. The body 3 is formed with a downwardly open slot 3'' into which the lower ends of the pins 14 and 18 project and a lever 19 pivoted at 20 in this slot 3'' has a front end on which the rod 14 bears and a rear end on which the rod 18 bears.

Thus if the rod 14 is pushed down, the lever 19 will push up the rod 18, thereby bringing the shoe 15 into contact with the wheels 1 and 2 and braking them.

The body 3 and rod 9'' are each further formed with two downwardly open notches 3' and 9''' extending radially of the hole 5 and diametrally of the axis 8 in line with each other. The lower end of the rod 14, which itself cannot rotate about the axis 8, carries a diametrally throughgoing pin 17 whose ends can be pulled up to seat in the notches 3' and 9''' to lock the body 3 against rotation about the axis 8. Normally the lifting mechanism is effective on the pin 14 via a spring so that as the notches 3' and 9''' align with the pin 17, same will be able to snap up into place and lock the caster.

I claim:

1. A two-wheel furniture caster comprising:
   a body;
   a shaft projecting horizontally through the body along a shaft axis and having opposite ends projecting axially oppositely from the body;
   respective wheels rotatable on the ends of the shaft and having outer tread parts axially delimiting a space wholly containing the body;
   an upright pivot pin having a lower end projecting into the body offset from the shaft axis along a pivot axis;
   bearings closely generally level and juxtaposed with the shaft axis in the body supporting the pivot pin in the body for rotation therein about the pivot axis;
   a shield ring generally centered on the shaft axis, wholly surrounding the body radially relative to the shaft axis, having axially opposite end edges closely juxtaposed with the respective wheels, and formed with a hole traversed by the pivot pin.

2. The two-wheel furniture caster defined in claim 1 wherein the body is formed with a horizontal rear bore accommodating the shaft and with a vertical front bore accommodating the bearings and the pin lower end.

3. The two-wheel furniture caster defined in claim 2 wherein the bearings are roller bearings.

4. The two-wheel furniture caster defined in claim 1 wherein the shield ring is of one piece.

5. The two-wheel furniture caster defined in claim 1 wherein the shield ring is formed of two similar parts joined generally in a plane including the pin axis and perpendicular to the shaft axis.

6. The two-wheel furniture caster defined in claim 1 wherein the shield ring is cylindrically tubular, the tread parts being formed with axially open grooves receiving the end edges of the shield ring.

7. The two-wheel furniture caster defined in claim 1 wherein the shield ring has respective webs extending radially inwardly from the respective end edges and having inner peripheries riding on hubs of the respective wheels.

8. The two-wheel furniture caster defined in claim 1 wherein the shield ring is formed with axially inwardly directed tabs closely fitting to and surrounding the body, whereby the tabs support the shield ring on the body.

9. The two-wheel furniture caster defined in claim 1, further comprising
   brake means in the space between the wheels for arresting rotation of the wheels; and
   actuating means including a rod extending coaxially through the pivot pin and axially displaceable therein for operating the brake means.

10. The two-wheel furniture caster defined in claim 9 wherein the brake means includes
    a brake shoe engageable outwardly with the tread parts of the wheels, and a linkage interconnecting the brake shoe and the actuating-means rod for pressing the brake shoe outwardly against the wheels.

11. The two-wheel furniture caster defined in claim 1, further comprising brake means in the space between the wheels for arresting pivoting of the body on the pin; and actuating means including a rod extending coaxially through the pivot pin and axially displaceable therein for operating the brake means.

12. The two-wheel furniture caster defined in claim 11 wherein the brake means includes a radially projecting pin fixed in the rod adjacent the body, vertically open seat grooves formed in the body adajent the rod and positioned to receive the pin when the rod is shifted axially, the rod itself being braced against rotation about its axis.

13. The two-wheel furniture caster defined in claim 1, further comprising brake means in the space between the wheels for arresting rotation of the wheels and for arresting pivoting of the body on the pin; and actuating means including a rod extending coaxially through the pivot pin and axially displaceable therein for operating the brake means.

14. The two-wheel furniture caster defined in claim 9 wherein the brake means includes a brake shoe engageable outwardly with the tread parts of the wheels, a linkage interconnecting the brake shoe and the actuating-means rod for pressing the brake shoe outwardly against the wheels on axial movement of the rod in a direction axially of the pin axis from a center position, a radially projecting pin fixed in the rod adjacent the body, and vertically open seat grooves formed in the body adajent the rod and positioned to receive the pin when the rod is shifted axially from the center position in the opposite direction, the rod itself being braced against rotation about its axis.

* * * * *